(12) United States Patent
Michel

(10) Patent No.: US 10,744,973 B2
(45) Date of Patent: Aug. 18, 2020

(54) BELT RETRACTOR

(71) Applicant: TRW AUTOMOTIVE GMBH, Alfdorf (DE)

(72) Inventor: Frederic Michel, Schwäbisch Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 231 days.

(21) Appl. No.: 15/757,996

(22) PCT Filed: Jul. 26, 2016

(86) PCT No.: PCT/EP2016/067709
§ 371 (c)(1),
(2) Date: Mar. 7, 2018

(87) PCT Pub. No.: WO2017/041953
PCT Pub. Date: Mar. 16, 2017

(65) Prior Publication Data
US 2018/0236969 A1    Aug. 23, 2018

(30) Foreign Application Priority Data
Sep. 11, 2015   (DE) .......................... 10 2015 011 668

(51) Int. Cl.
*B60R 22/34*  (2006.01)
*B60R 22/405* (2006.01)

(52) U.S. Cl.
CPC ............ *B60R 22/34* (2013.01); *B60R 22/405* (2013.01); *B60R 2022/3402* (2013.01)

(58) Field of Classification Search
CPC .................. B60R 22/34; B60R 22/405; B60R 2022/3402
See application file for complete search history.

(56) References Cited

U.S. PATENT DOCUMENTS

| 2008/0135665 A1* | 6/2008 | Schmidt | ................. B60R 22/40 242/384.4 |
| 2015/0001331 A1* | 1/2015 | Michel | ................ B60R 22/3413 242/396.2 |

FOREIGN PATENT DOCUMENTS

| DE | 3418378 | 2/1986 |
| DE | 0359960 | 3/1990 |
| DE | 9005829.1 | 9/1990 |
| DE | 102006037544 | 2/2008 |
| WO | 2012003909 | 1/2012 |

* cited by examiner

*Primary Examiner* — Sang K Kim
(74) *Attorney, Agent, or Firm* — Tarolli, Sundheim, Covell & Tummino LLP

(57) ABSTRACT

A belt retractor for a vehicle seat belt comprises a frame, a belt reel which is rotatably supported within the frame, a shell (16), a sensor (18) for vehicle-sensitive locking which includes a sensor lever (20), and comprising an idler arm (22) contacting a sensor (18) and being adjustable between an initial position in which the sensor lever (20) is locked and an extracting position in which the sensor lever (20) is released. The idler arm (22) is coupled to a damping element (26) having speed-sensitive damping characteristics.

14 Claims, 4 Drawing Sheets

BELT RETRACTOR

RELATED APPLICATIONS

This application corresponds to PCT/EP2016/067709, filed Jul. 26, 2016, which claims the benefit of German Application No. 10 2015 011 668.1, filed Sep. 11, 2015, the subject matter of which are incorporated herein by reference in their entirety.

BACKGROUND OF THE INVENTION

The invention relates to a belt retractor for a vehicle seat belt.

Belt retractors comprise a vehicle-sensitive locking system usually provided with a sensor which normally includes, as an inertia mass, a metal ball which is movably supported in a shell fixed to the housing. A sensor lever which is pivoted to a housing and is swiveled about its pivot bearing by the movement of the metal ball rests on the metal ball. During said swivel of the sensor lever, the end thereof enters the path of motion of control teeth at the periphery of a control disk arranged on the belt reel so as to be rotatable to a limited extent. In this way the control disk is locked so that a relative rotation occurs between the control disk and the belt reel. Said relative rotation is exploited to move a locking blade pivoted to a frame of the belt retractor into locking engagement with locking teeth being associated with the belt reel.

When running on an uneven road, vibrations of the vehicle body will occur which cause the metal ball and, consequently, also the sensor lever to be deflected at short intervals, thus producing disturbing noise.

For reducing said disturbing noise use is made of belt retractors including an idler arm which is coupled to the belt reel via a friction coupling and prevents the metal ball from deflecting. Such belt retractor is known, for example, from DE 10 2006 037 544 A1.

However, it is not always possible to design the known belt retractors in an optimum manner, however, due to the partially contrary requirements as regards the maximum admissible locking path and a significant noise reduction in the real vehicle environment and during normal driving.

SUMMARY OF THE INVENTION

It is the object of the invention to provide a belt retractor in which the occurrence of disturbing noise is definitely reduced and which, at the same time, has minimum locking paths.

For achieving the object, a belt retractor for a vehicle seat belt is provided comprising a frame, a belt reel rotatably supported in the frame, a shell and a sensor for vehicle-sensitive locking which includes a sensor lever. The belt retractor comprises an idler arm contacting a sensor and being adjustable between an initial position in which the sensor lever is locked and an extracting position in which the sensor lever is released, wherein the idler arm interacts with a damping element the damping characteristics of which are speed-sensitive. This allows to differentiate between a dynamic operating state and a quasi-static operating state of the belt retractor. The quasi-static operating state comprises a range reaching from no belt movement to a belt extraction rate which is lower than a predetermined webbing extraction rate resulting in locking of the webbing. In this operating state, abutment of the sensor is not desired and disturbing noise is suppressed by the sensor lever being locked by the idler arm. In the dynamic operating state, the webbing is extracted at a webbing extraction rate which is above a predetermined value. In this event, the idler arm releases the sensor lever and potential emergency latching is admitted.

In an advantageous configuration, such damping element the damping characteristics of which are speed-sensitive is a rotational damper containing a viscous medium for damping the movement of rotation. The structural-viscous characteristics of the medium require a speed-sensitive torque.

The belt retractor according to the invention preferably comprises a return spring which applies a restoring force to the idler arm for returning the idler arm after deflection to the initial position again and which is preferably adjacent to the shell. In this way, the idler arm is ensured to return, after being deflected, to its initial position in which it locks the sensor lever and thus ensures noise suppression.

It is advantageous when the belt retractor comprises a return spring which is adjacent to the shell and via the idler arm exerts a force on the sensor that is sufficient to suppress movement of the sensor at a belt extraction rate lower than a predetermined webbing extraction rate resulting in locking of the webbing. Thus, the sensor is prevented from moving and causing disturbing noise in the quasi-static operating state.

In a preferred embodiment, the idler arm contacts the sensor only locally and releases the sensor as soon as the idler arm is moving away. Thus, the idler arm is prevented from interfering with the tip of the sensor so that the belt retractor satisfies the FMVSS or AK-LV specification.

The rotational damper may be coupled to the belt reel so as to be rotationally driven.

In particular, the rotational damper may be coupled to the belt reel also via a gearing. In this way, it is possible to specifically design the coupling and to bring the rotational damper to an appropriate rotational speed which is optimal for damping.

Preferably the rotational damper is positioned between the belt reel and the idler arm so that upon rotation at a predetermined rotational speed the belt reel moves the idler arm away from the sensor via the rotational damper. In this way, the idler arm is prevented from locking the sensor in the dynamic operating state and an emergency latching is possible.

The gearing may comprise a toothed ring in the external teeth of which the rotational damper engages via a pinion. In this way, any rotational movement inside the gearing is detected by the rotational damper.

Of preference, the gearing comprises a toothed ring in the internal teeth of which the belt reel engages via a planetary wheel.

In an advantageous embodiment, the sensor is a ball sensor and the idler arm is preferably adjacent to the sensor lever resting on a ball so that a conventional sensor may be used.

In another advantageous embodiment, the rotational damper comprises a housing, a rotor as well as a packing and is filled especially with silicone oil.

BRIEF DESCRIPTION OF THE DRAWING

Further advantages and features will be evident from the following description in combination with the enclosed drawings, in which.

DESCRIPTION

Belt retractors for vehicle seat belts are basically known. Also, the basic structure of the locking system for vehicle-sensitive locking of the belt reel of the belt retractor is known. Therefore, the structure and the function of the belt retractor and of the locking system will be described here only so far as this is required for the comprehension of the invention.

Figure 1:
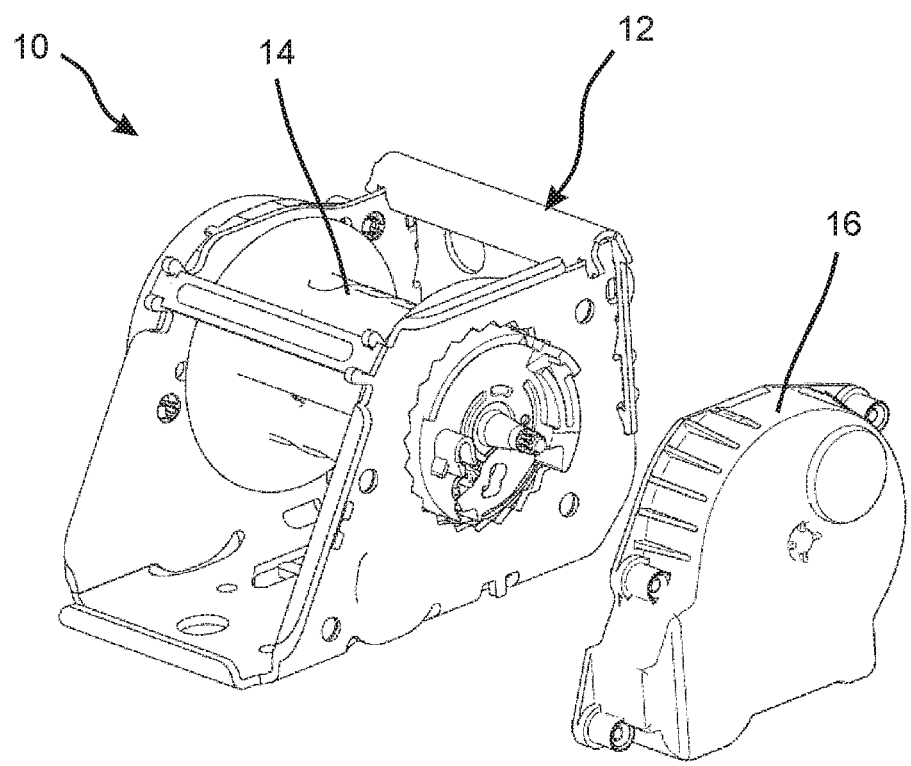
FIG. 1 shows a belt retractor according to the invention in a perspective view.

FIG. 1 illustrates a belt retractor 10 comprising a housing including a frame 12, a belt reel 14 rotatably supported in the frame 12 and a shell 16 arranged on the outside of the frame 12 for accommodating the sensor unit for locking the belt reel.

Figure 2:
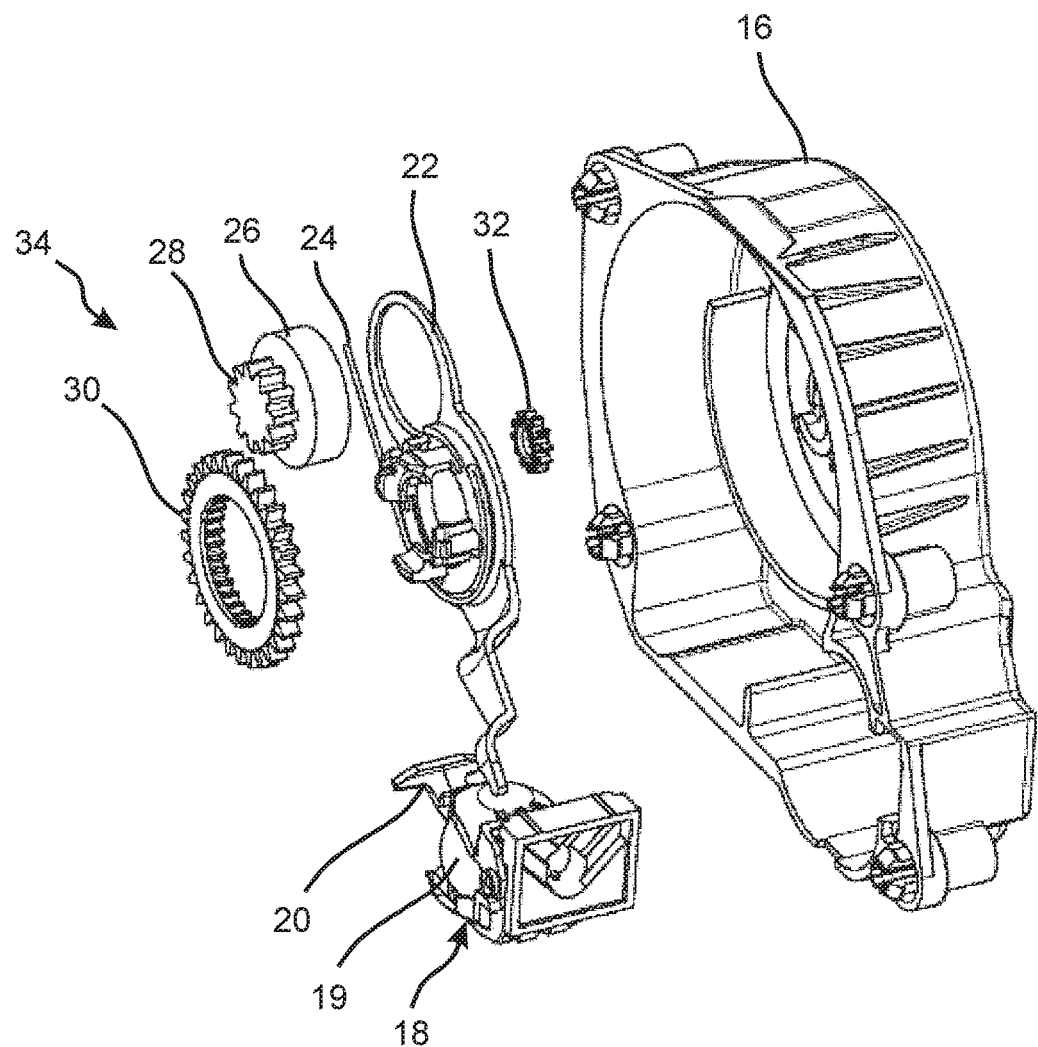
FIG. 2 shows a shell including a sensor unit disposed therein for vehicle-sensitive locking of a belt retractor according to the invention in an exploded view.

FIG. 2 illustrates the shell 16 comprising a sensor unit for vehicle-sensitive locking of the belt reel 14 in an exploded view. Said sensor unit comprises a ball sensor 18 for vehicle-sensitive locking which includes a sensor lever 20 resting on a movable ball 19 as well as an idler arm 22 which contacts the sensor 18.

A return spring 24 and a rotational damper 26 are arranged on the idler arm 22.

The rotational damper 26 includes, at its outside, a pinion 28 which together with a toothed ring 30 and a planetary wheel 32 is part of the gearing 34.

Figure 3:
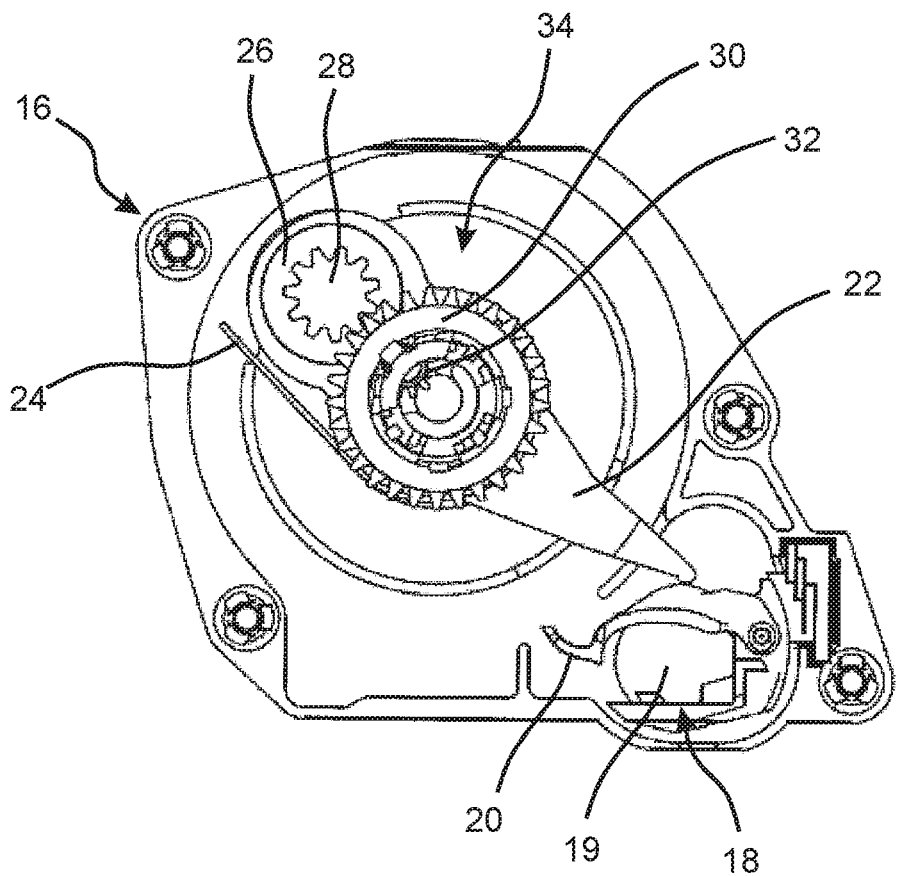
FIG. 3 shows a side view of the shell and the sensor unit disposed therein of a belt retractor according to the invention.

FIG. 3 illustrates, in a side view, the arrangement of the sensor unit shown in FIG. 2 within the shell 16. The sensor 18 which, as afore-mentioned, is a ball sensor in this case is locked by the idler arm 22, as the latter is locally adjacent to the sensor lever 20 resting on the ball 19.

The contact point preferably is the uppermost point of the idler arm 22 in the mounted state.

The return spring 24 contacting the idler arm 22 and the shell 16, in this case a torsion or leaf spring, applies a restoring force which maintains the idler arm 22 in contact with the sensor 18 and exerts a predetermined force on the same to the idler arm 22. Thus, any undesired movements of the sensor 18 and, consequently, any disturbing noise are prevented from occurring during normal driving.

The idler arm 22 is torque-coupled to the gearing 34 via the rotational damper 26. The movement of rotation of the belt reel 14 is transmitted via the planetary wheel 32 which is supported within the shell 16 and is in mesh with the internal teeth of the toothed ring 30 to the rotational damper 26 including the pinion 28 which engages in the external teeth of the toothed ring 30. In this way, any movement inside the gearing 34 is detected and damped by the rotational damper 26.

Due to the structural-viscous characteristics of the rotational damper 26, a speed-sensitive torque acts on the idler arm 22.

In the case of a belt movement the belt extraction rate of which is lower than a predetermined webbing extraction rate resulting in locking of the webbing, the belt retractor 10 is provided in the quasi-static operating state. In said operating state, the torque acting on the idler arm 22 is not sufficient to overcome the restoring force of the return spring 24. Hence, the idler arm 22 is retained in its initial position in which the sensor lever 20 is locked and presses against the ball 19, thus suppressing disturbing noise.

In the case of a belt movement the webbing extraction rate of which is above a predetermined value, the belt retractor 10 is provided in the dynamic operating state. In this case, the torque acting on the idler arm 22 is so high that the idler arm 22 locally contacting the sensor 18 moves away from the latter into an extracting position, thus causing the sensor lever 20 to be released and a potential emergency latching to be admitted.

When the belt retractor 10 changes from a dynamic operating state to the quasi-static operating state again, the return spring 24 ensures that the idler arm 22 returns from the extracting position to its initial position again.

In order to ensure that the belt retractor 10 satisfies the FMVSS or AK-LV specification, it is important that the idler arm 22 does not interfere with the tip of the sensor 18 but contacts the sensor 18 merely locally. The sensor 18 has to be released as soon as the idler arm 22 is moving.

Figure 4:
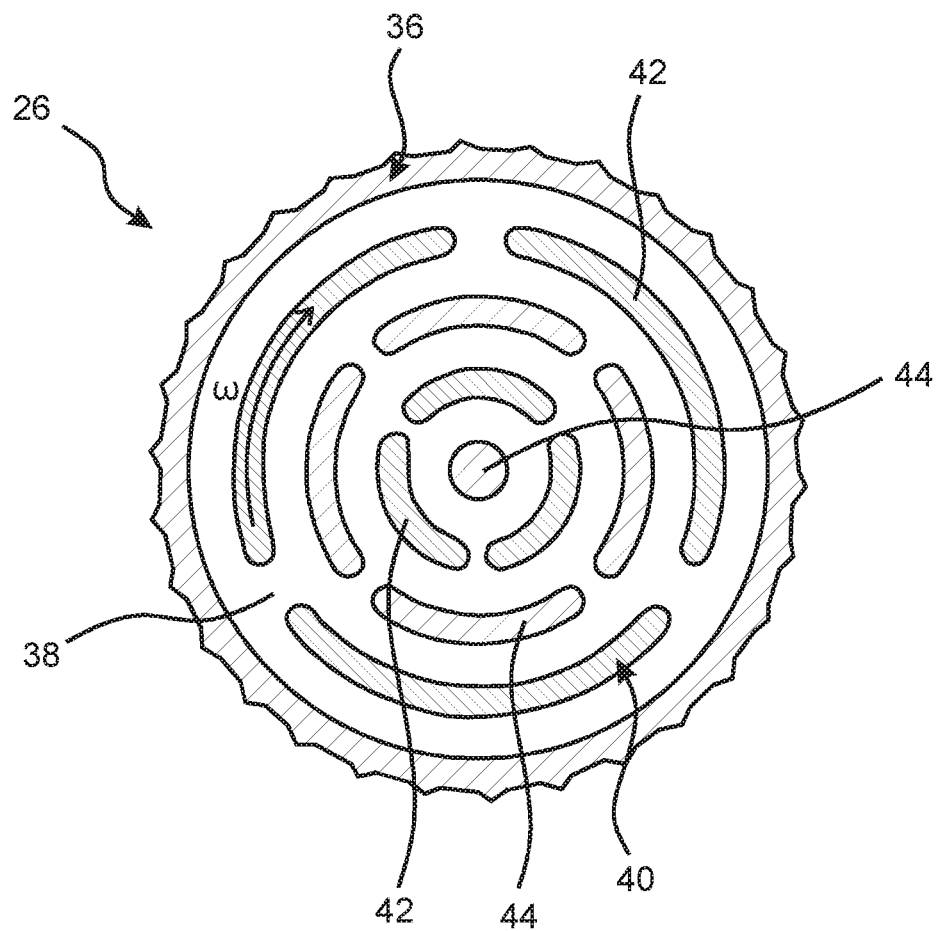
FIG. 4 shows a sectional view of a rotational damper of a belt retractor according to the invention.

In FIG. 4, the rotational damper 26 is illustrated in a sectional view. It comprises, for example, a rotor 40 which is supported so as to rotate in a housing 36 which is filled with structural-viscous medium 38, preferably with silicone oil, and which is sealed by a cover with the aid of a packing. A shaft to which the pinion 28 is integrally formed or coupled is provided on the rotor 40. Both on the rotor 40 and on the housing 36 extensions 42, 44 protruding into the interior of the rotational damper are integrally formed, said extensions engaging in each other and constituting resistances for the medium 38 when the extensions 42, 44 are rotating relative to each other.

During operation of the rotational damper 26, the rotor 40 is driven by the gearing 34 via the pinion 28. In the case of low angular rates w, the structural-viscous medium 38 is entrained only in the vicinity of the extensions 42, while the laminar flow in the radial direction decreases with the distance from the extensions 42 and the interaction with the extensions 44 is relatively small. In the case of higher angular rates w, the degree of interaction between the laminar flow and the extensions 44 increases so that in the case of high speeds of the rotor 40 a higher torque is transmitted to the housing 36.

This flow of a viscous fluid occurring between two coaxial cylinders rotating relative to each other is also known as Couette flow.

The invention claimed is:

1. A belt retractor (10) for a vehicle seat belt comprising a frame (12), a belt reel (14) which is rotatably supported within the frame (12), a shell (16), a sensor (18) for vehicle-sensitive locking which includes a sensor lever (20), and comprising an idler arm (22) being in contact with the sensor (18) and adjustable between an initial position in which the sensor lever (20) is locked and an extracting position in which the sensor lever (20) is released, the idler arm (22) being in the initial position when a belt extraction rate is below a predetermined value, the idler arm (22) being in the extracting position when the belt extraction rate is above the predetermined value, wherein the idler arm (22) interacts with a damping element (26) so that a speed-sensitive torque acts on the idler arm (22) to move the idler arm (22) to the extracting position when the belt extraction rate is above the predetermined value.

2. The belt retractor according to claim 1, wherein the damping element is a rotational damper (26) containing a viscous medium (38) for damping.

3. The belt retractor according to claim 1, wherein the belt retractor (10) comprises a return spring (24) which applies a restoring force returning the idler arm (22) to the initial position after deflection and being adjacent to the shell (16).

4. The belt retractor according to claim 1, wherein the belt retractor (10) comprises a return spring (24) which is adjacent to the shell (16) and via the idler arm (22) exerts a force upon the sensor (18) which force is sufficient to suppress a movement of the sensor (18) at a belt extraction rate which is lower than the predetermined value which results in locking of the webbing.

5. The belt retractor according to claim 1, wherein the idler arm (22) locally contacts the sensor (18) and releases the sensor (18) as soon as the idler arm (22) is moving away.

6. The belt retractor according to claim 1, wherein the damping element (26) is coupled to the belt reel (14).

7. The belt retractor according to claim 6, wherein the damping element (26) is coupled to the belt reel (14) via a gearing (34).

8. The belt retractor according to claim 7, wherein the gearing (34) comprises a toothed ring (30) in the external teeth of which the damping element (26) engages via a pinion (28).

9. The belt retractor according to claim 7, wherein the gearing (34) comprises a toothed ring (30) in the internal teeth of which the belt reel (14) engages via a planetary wheel (32).

10. The belt retractor according to claim 1, wherein the damping element (26) is positioned between the belt reel (14) and the idler arm (22) so that during rotation at a predetermined rotational speed, the belt reel (14), via the damping element (26), moves the idler arm (22) away from the sensor (18) and to the extracting position.

11. The belt retractor according to claim 1, wherein the sensor (18) is a ball sensor and the idler arm (22) is adjacent to the sensor lever (20) which rests on a ball.

12. The belt retractor according to claim 1, wherein the damping element (26) is a rotational damper (26) comprising a housing (36), a rotor (40) and a packing, the housing (36) being filled with silicone oil.

13. The belt retractor according to claim 1, wherein the sensor (18) is a ball sensor having the sensor lever (20) and a ball (19), the idler arm (22) pressing the sensor lever (20) against the ball (19) to suppress movement of the ball when in the initial position, the idler arm (22) releasing the sensor lever (20) to permit movement of the ball (19) when in the extracting position.

14. A belt retractor (10) for a vehicle seat belt comprising a frame (12), a belt reel (14) which is rotatably supported within the frame (12), a shell (16), a ball sensor (18) for vehicle-sensitive locking which includes a sensor lever (20) and a ball (19), and an idler arm (22) in contact with the sensor (18) and adjustable between an initial position in which the idler arm presses the sensor lever (20) against the ball (19) to suppress movement of the ball, and an extracting position in which the idler arm (22) releases the sensor lever (20) to permit movement of the ball (19), the idler arm (22) interacting with a damping element (26) so that a speed-sensitive torque acts on the idler arm (22) via the damping element (26).

\* \* \* \* \*